J. P. VION.
WATER HEATING DEVICE.
APPLICATION FILED DEC. 19, 1916.
1,254,454.
Patented Jan. 22, 1918.
2 SHEETS—SHEET 1.
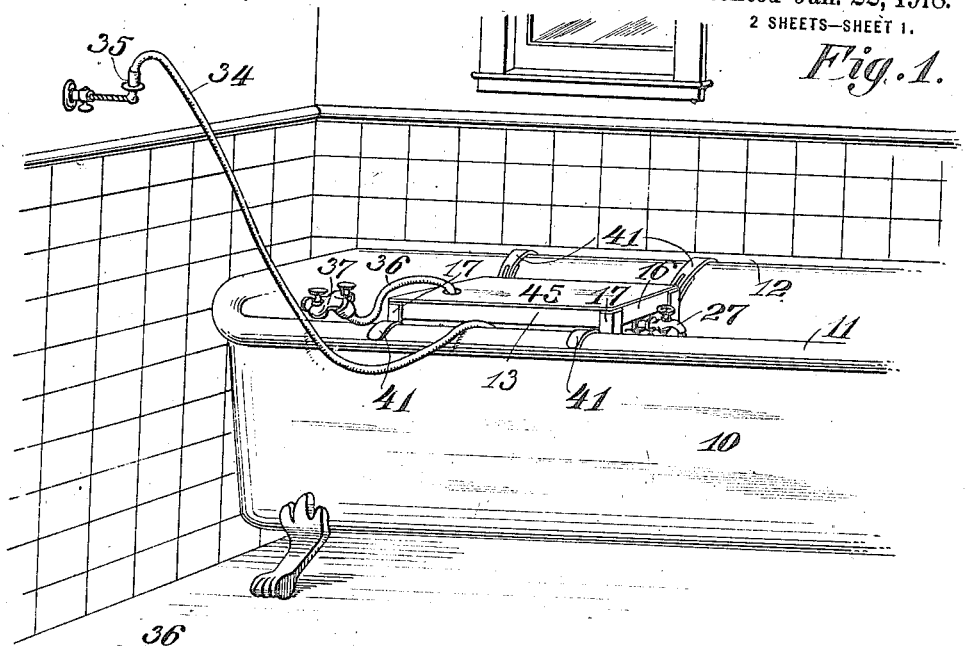
Fig. 1.
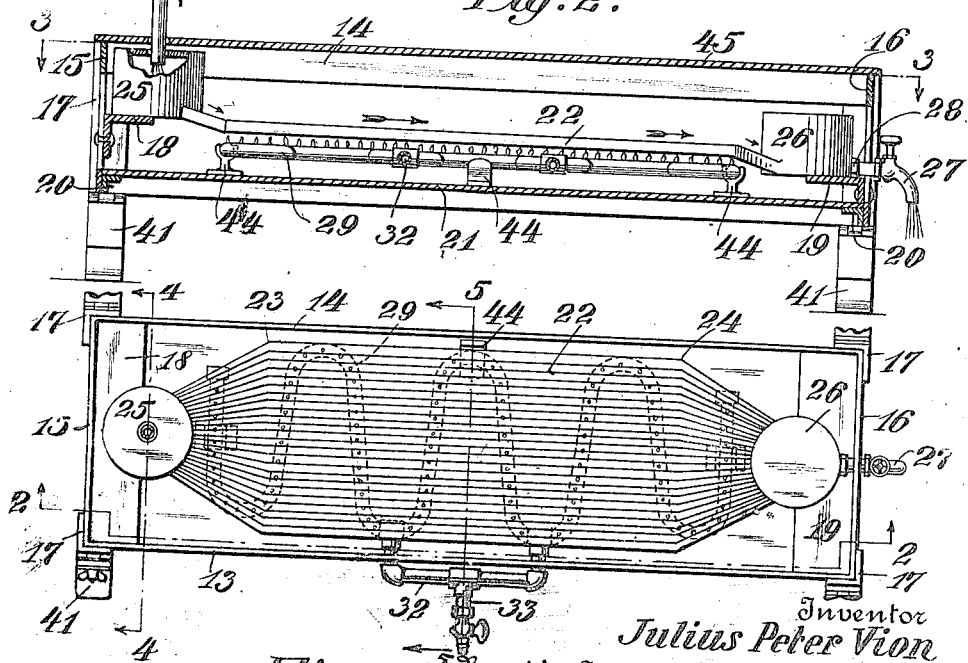
Fig. 2.
Fig. 3.
Inventor
Julius Peter Vion
By his Attorney J. P. VION.
WATER HEATING DEVICE.
APPLICATION FILED DEC. 19, 1916.
1,254,454.
Patented Jan. 22, 1918.
2 SHEETS—SHEET 2.
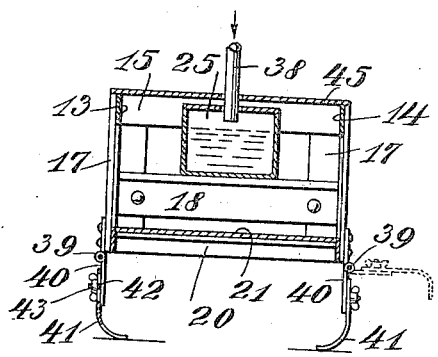
Fig. 4.
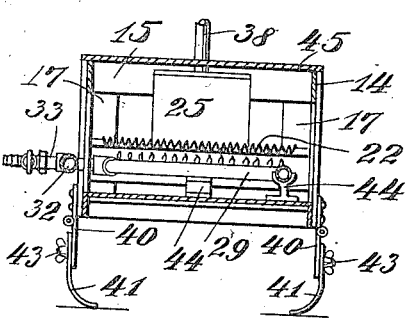
Fig. 5.
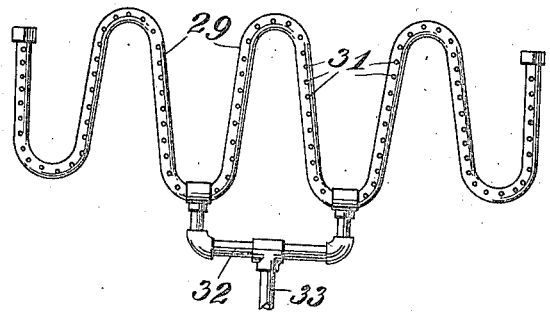
Fig. 6.
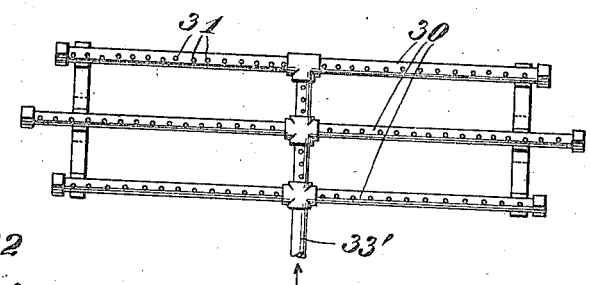
Fig. 7.
Fig. 8.
Inventor
Julius Peter Vion
By his Attorney

UNITED STATES PATENT OFFICE.

JULIUS PETER VION, OF JERSEY CITY, NEW JERSEY.

WATER-HEATING DEVICE.

1,254,454.     Specification of Letters Patent.     Patented Jan. 22, 1918.

Application filed December 19, 1916. Serial No. 137,804.

*To all whom it may concern:*

Be it known that I, JULIUS PETER VION, a citizen of the United States, residing at Jersey City, in the county of Hudson and State of New Jersey, have invented new and useful Improvements in Water-Heating Devices, of which the following is a specification.

The subject-matter of this invention is a water-heating device, and the general object thereof is the provision of a device which may be used in connection with a bath tub, and which is designed to provide for the suitable heating of a sheet of water as it advances by gravity in one direction between two points.

A further object is the provision of a device of the type indicated having supporting arm elements extensible and adjustable in such manner as to accommodate the device to different sizes of bath tubs, the said elements being further designed so that they may be serviceable as legs for the support of the device when it is used otherwise than in connection with a bath tub.

A still further object is the provision of a portable device of the type indicated, which is simple in construction, comparatively inexpensive to manufacture, and effective in operation.

With these and other objects, which will become apparent as the description proceeds, the invention resides in the details of construction and in the combination and arrangement of parts hereinafter described, defined in the claims, and shown in the accompanying drawings, forming a material part of this specification, it being understood that changes in the precise embodiment of the invention herein disclosed can be made within the scope of what is claimed without departing from the spirit of the invention.

In the accompanying drawings:—Figure 1 is a view in perspective showing the invention applied to a bath tub in position for service.

Fig. 2 is a longitudinal sectional view, taken approximately on the line 2—2 of Fig. 3.

Fig. 3 is a top plan view with the cover removed.

Fig. 4 is a cross section taken on the line 4—4 of Fig. 3.

Fig. 5 is a similar view taken on the line 5—5 of Fig. 3.

Fig. 6 is a top plan view of one form of the burner pipes.

Fig. 7 is a similar view of another form of the burner pipes, and

Fig. 8 is a fragmental section of the water-channels.

As exemplified in the illustration shown in Fig. 1, the numeral 10 denotes a bath tub, upon and between the opposed sides 11 and 12 of which is suspended a frame for the convenient and suitable support of the parts composing the device. This frame is made preferably out of angle-iron of a light character, though in practice if deemed necessary, other suitable material may be employed. The frame is made preferably rectangular in shape and is composed of the top parallel side members 13 and 14 which are securely connected at their opposed ends by the cross pieces 15 and 16. For the suitable support of the frame, legs 17 are employed, there being, as shown in Fig. 3, a leg provided and secured to each corner of the frame. Riveted or otherwise secured to the inner sides of both legs at one end of the frame is a bracket 18 which projects inwardly, while to the inner sides of both legs at the opposite end of the frame is secured a similar bracket 19; but it will be noted here that the bracket 19 is secured to its legs a little lower than the plane of the bracket 18, the purpose whereof will be hereinafter made clear. Secured further to the inner sides of the legs below the aforesaid brackets are brackets 20, which are employed to support a plate 21 made preferably of tin, for a purpose to be hereinafter explained.

The provision of a travelway plate by which to heat the water quickly as it moves by gravity is accomplished by forming out of a thin sheet of suitable metal a plurality of slightly inclined longitudinal channels as 22 which are of V-shape in cross-section, as best illustrated in Fig. 8. At the points or bends 23 and 24, at each end, these channels are made to converge to provide for continuous communication with the water pockets 25 and 26, which are preferably circular in form. It will be noted here that the converging channels 22 beyond the point 23 are inclined upwardly, and that the bottom of the pocket 25, with which pocket they communicate, is located a little higher than the bottoms of the channels to enable the water to flow by gravity. Similarly, the channels 22 beyond the point 24 are inclined downwardly, but the bottom of the pocket 26, with which pocket they also communicate, is located slightly lower than said channels. The water travelway thus formed in combination with the pockets is removably inserted in the frame so that the pocket 25 rests upon the bracket 18, while the pocket 26 rests upon the lower bracket 19. Pocket 25 is thus made to perform the service of a distributing reservoir, it being well adapted to distribute the water equally into the inclined channels 22, the water thus distributed gradually moving by gravity into the pocket 26, which serves as a dispensing reservoir for the heated water. As a means of dispensing the heated water, I prefer to employ a faucet 27 which is threaded into coupling 28 provided for the purpose in pocket 26.

To supply a continuous and in so far as possible an equal distribution of heat whereby to heat the water quickly as it advances from pocket 25 to pocket 26, I employ burner-pipes 29 which are curved preferably in zig-zag formation, as best shown in Fig. 6. A plurality of burner pipes 30, arranged in the form indicated in Fig. 7, will also distribute the heat as desired, while it will be manifest that still other forms may be used to advantage. These burner-pipes are supported immediately below the bottom of the travelway upon removable yoke-like elements 44 which rest upon the plate 21, the latter being adapted to prevent the heat of the burner-pipes from injuring the floor, table or any other support upon which the frame may be placed when the device is used, otherwise than in connection with a bath tub. The burner-pipes have the usual escape openings 31 for the combustion of the gas supplied to the tubes. Where the zig-zag formation of pipes is employed, I prefer to feed the tubes by means of a coupling 32 which communicates with a main feed pipe 33, to which a rubber gas tube as 34 is removably secured, the remote end of which is prepared to engage the jet of a customary gas burner as 35.

Water is supplied to the distributing reservoir 25 by means of a tube 36 which is removably connected to the water faucet 37 at one end and to the receiving pipe 38 at the other end, said pipe being supported on, and opening directly into, the distributing pocket 25.

Hinged to the legs 17 by the hinges 39 are the arms 40 to which are connected the extensions 41 provided with curved ends. Said extensions 41 are made adjustable relatively lengthwise with respect to the arms 40 by means of the ordinary pin and slot connections 42, wing nuts as 43 serving to clamp them together in the relative position desired. When the arms 40 are extended, the curved ends of extensions 41 are adapted to engage the sides of the bath tub, to suspend the frame therebetween, and when said arms are swung downwardly, as shown in Fig. 2, they serve as feet for the frame.

From the foregoing, it will be seen that the device is portable; that it may be mounted upon the bath tub when bath tub water is to be heated; and that it may be removed from the bath tub and stood upon the floor, when not in service, or when water is desired to be heated in the kitchen or in any other part of the house. The tube 34, which supplies the burner-pipes with gas, is connected to a convenient gas jet, while the tube 36 is connected with a water faucet. In cases in which no water under pressure is available, the water to be heated may readily be poured into the supply pipe 38, the top end of which is made preferably funnel shaped as shown. Upon entering the distributing pocket 25, the water is distributed by gravity into the plurality of V-shaped channels and proceeds into the dispensing pocket 26, the inclination of the channels being such that the water advances approximately slowly. As it advances from one pocket to the other, the water is engaged continuously with the heated travelway; and it will be observed in this connection that the formation of the V-shaped channels will bring practically all portions of the advancing water under the influence of the heat, while the underneath deformations formed by the V-shaped channels provides admirable recesses for gathering and holding the hot gases during combustion.

Having thus described my invention, what I claim is:—

1. The herein-described portable water-heating device comprising a rectangular skeleton frame divided by inward supports into upper and lower parts, a water travelway formed with a plurality of channels V-shaped in cross-section mounted in the upper part, said channels being slightly inclined longitudinally and converging at each end, a water pocket combined with said travelway at each end in inclined communication with the converging channels thereof, and means disposed in the lower part for heating the water as it advances in the travelway from one pocket to the other.

2. The herein-described portable water-heating device comprising a rectangular skeleton frame divided by inward supports into upper and lower parts, adjustable arms hinged to said frame whereby to support it in varying positions, a water travelway formed with a plurality of inclined channels V-shaped in cross-section resting in the upper part, said channels at a point near each end converging toward a center, a water pocket combined with said travelway at each end thereof and in communication with the converging ends of said channels, and a source of heat disposed in the second part.

3. The herein-described portable water-heating device comprising a skeleton frame divided by inward supports into upper and lower parts, a longitudinal water runway formed with a plurality of uniform inclined channels V-shaped in cross-section mounted in the upper part, said channels at a point near each end converging toward a center, a water pocket combined with said runway at each end thereof in communication with the converging ends of said channels, one pocket being higher than the other, means for supplying the higher pocket with water, means disposed in the lower part for heating the water as it travels through the channels and means for dispensing water from the lower pocket.

4. The herein-described portable water-heating device having a skeleton frame divided by inward supports into upper and lower parts, arm elements hinged to the frame in such manner as to be swung downwardly for the upstanding support of the frame in varying positions, a water travelway formed with a plurality of inclined channels V-shaped in cross-section mounted in the upper part, a water pocket combined with said travelway at each end thereof in inclined communication with said channels, and one pocket being higher than the other, means disposed in the lower part extending approximately the length of the travelway for heating the water as it travels from one pocket to the other.

5. In the herein described water heating device, the combination of a skeleton frame and means for supporting it in varying positions, an inwardly projecting support secured at each end of the frame, one support being relatively higher than the other, a water pocket mounted upon each support, a longitudinal water travelway connecting the pockets in slightly inclined position, said travelway having a main portion formed with a plurality of parallel V-shaped channels in cross-section, said channels at each end converging toward a center and so communicating with the pockets, said converging portions of the channels being inclined at a greater degree than the main portion, and means disposed below the main portion extending approximately the entire length thereof for heating water as it flows through the same by gravity from one pocket to the other.

In testimony whereof I have signed my name to this specification.

JULIUS PETER VION.